March 7, 1961  L. M. CURTISS  2,974,185
GROUNDING DEVICE FOR ELECTRICAL WIRING SYSTEMS
Filed July 5, 1957
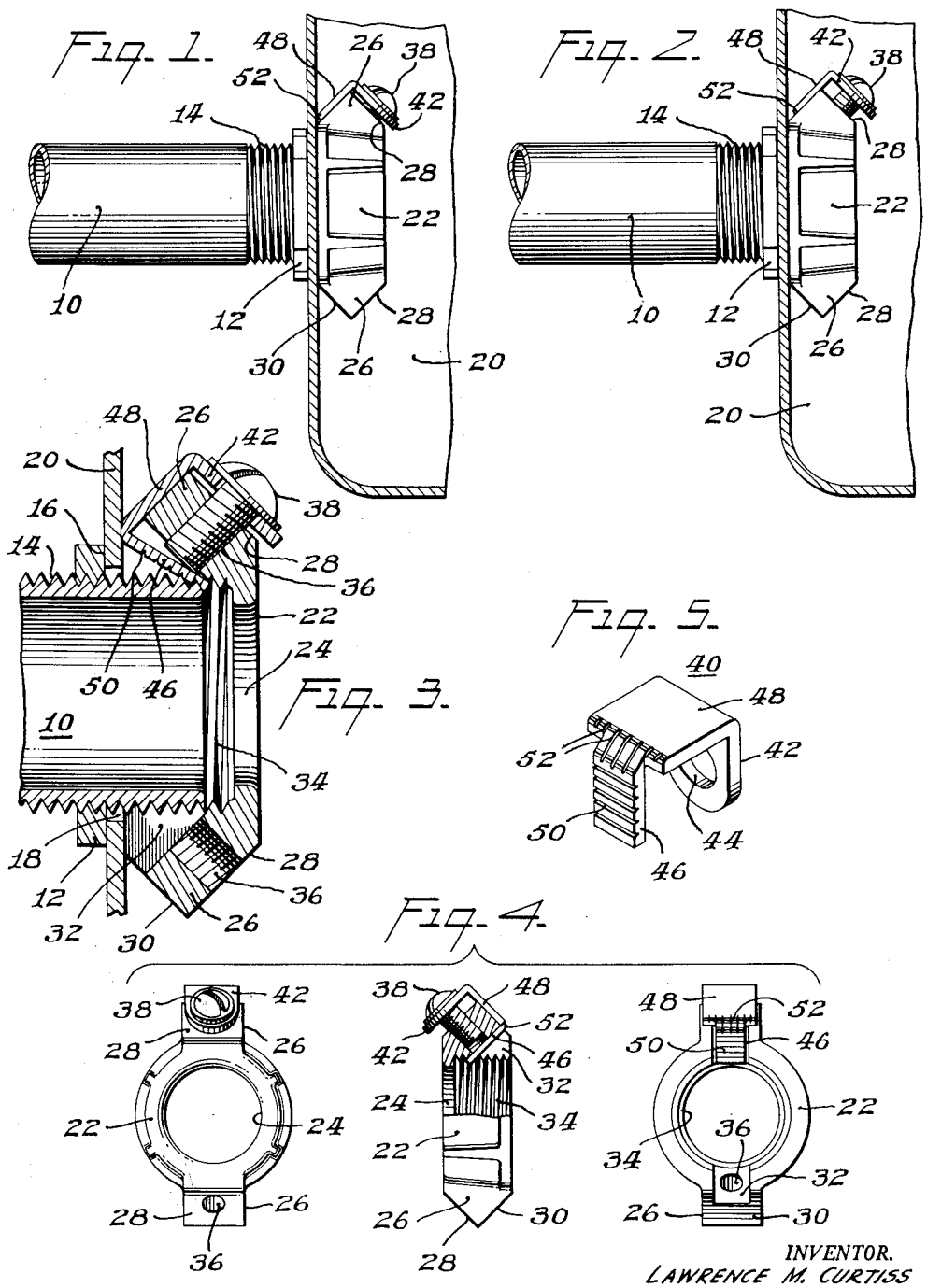
INVENTOR.
LAWRENCE M. CURTISS
BY
ATTORNEY.

United States Patent Office 2,974,185
Patented Mar. 7, 1961

2,974,185

GROUNDING DEVICE FOR ELECTRICAL WIRING SYSTEMS

Lawrence M. Curtiss, Mountainside, N.J., assignor to The Thomas & Betts Co., Elizabeth, N.J., a corporation of New Jersey Filed July 5, 1957, Ser. No. 670,109

2 Claims. (Cl. 174—51)

The invention relates to grounding devices for electrical raceway systems and more particularly to improvements in a grounding bushing adapted for securing a conduit in a knock-out opening in a conventional outlet box and for effecting an approved electrical path from the conduit through the outlet box to ground.

More specifically, the invention resides in a grounding bushing of the character described wherein an adjustable grounding element is carried by and confined, at least in part, within the bushing for directly bearing on the screw threads provided on the terminal end portion of a conduit for receiving the bushing in threaded engagement therewith.

Analogous grounding bushings of the prior art were not altogether satisfactory by reason of the fact that an adjustable element for effecting a tight connection to ground was either separate from or secured on the exterior of the bushing for adjustment against the inner wall surface of an outlet box or secured to the outlet box for adjustment on the outer periphery of the bushing. Thus, the grounding efficiency of such prior art devices was dependent upon a point or spot contact with an outlet box or bushing, which contact was subsequently more or less impaired by corrosion, vibration, or contraction in response to low temperature conditions.

Accordingly, it is an object of the invention to provide an improved grounding bushing adapted for effecting an approved positive ground connection which is not subject to the above-noted disadvantages.

Another object of the invention is to provide an improved grounding bushing which is adapted for securing a screw-threaded end portion of a conduit in an opening provided therefor in an outlet box and for simultaneously grounding the bushing on the outlet box and on the threaded end portion of the conduit.

A further object of the invention is to provide an improved grounding bushing wherein an adjustable element is adapted to have direct bearing engagement with the threaded end portion of a conduit upon securing the bushing thereon.

Another object of the invention is to provide an improved grounding bushing wherein a grounding element carried by the bushing is partly disposed within the bushing and adapted to be forced into bearing engagement with the screw-threaded end portion of a conduit by the threading of the bushing thereon.

A further object of the invention is to provide an improved grounding bushing wherein an auxiliary grounding element is adapted to be brought into direct bearing engagement with a wall surface of an outlet box and with the screw-threaded end portion of a conduit after the grounding bushing has been secured thereon.

With the above and other objects in view, the invention resides in the novel construction, combination, and arrangement of parts, the novel features of which are set forth with particularity in the appended claims, the invention itself, however, both as to its organization and methd of operation, together with additional objects and advantages thereof, being best understood from the following description of a specific embodiment thereof, when taken in connection with the accompanying drawing, in which:

Fig. 1 is a plan view, partly in section, illustrating a conventional outlet box and conduit in final assembled relation with an improved grounding bushing constructed in accordance with the invention;

Fig. 2 is a view similar to Fig. 1, illustrating the improved grounding bushing as mounted on a conduit end portion, intruded into a conventional outlet box, in initial assembled relation;

Fig. 3 is a fragmentary sectional view of Fig. 1, illustrating the improved grounding bushing on the intruded end portion of a conduit and the manner in which a grounding element, secured to the bushing, is disposed in bearing engagement with a wall of an outlet box and in threaded engagement with the screw-threads on the conduit end portion;

Fig. 4 illustrates a front end elevation, side elevation, and rear end elevation, respectively, of the improved grounding bushing and grounding element carried thereby; and Fig. 5 is a perspective view of the grounding element per se.

Referring to the drawing, a conduit 10, adapted to serve as a raceway for receiving electric cable conductors therethrough, is provided with a suitable lock-nut 12, on a screw-threaded end portion 14 thereof to form an annular shoulder 16 thereon suitably spaced from its free end. As clearly shown in Fig. 1, the screw-threaded portion 14 of the conduit 10, is inserted in a selected one of a plurality of knock-out openings 18, usually provided therefor in a conventional junction or outlet box 20, and an improved grounding bushing 22, secured on the screw-threaded portion 14 of the conduit 10, whereby one wall of the outlet box 20 is clamped between the shoulder 16, formed by the lock-nut 12, and the grounding bushing 22, to secure the conduit 10 in the outlet box 20 in grounded relation therewith.

In accordance with the invention, the improved grounding bushing 22, usually a casting of suitable metal, having an internal annular flange 24 at one end thereof, is formed with one or a pair of radially extending projections or bosses 26 on the outer periphery thereof in diametrically opposite relation, the bosses or lugs 26 being of rectangular configuration in outline to provide front and rear faces 28 and 30 inclined at an angle to the axial center of the bushing 22, as clearly shown in Figs. 1, 2 and 3.

As best shown in Fig. 3, each of the bosses 26 is provided with a rectangular slot 32, which may be either cast or machined in the underside thereof in parallelism with its front face 28 and in intersecting relation with the inner periphery of the bushing 22, to provide a recess for freely receiving therein a portion of a grounding member of the character and in the manner hereinafter described.

The inner periphery of the grounding bushing 22 is subsequently provided with a screw-thread 34, extending from its rear end face substantially to the inner side of the annular flange 24 at its opposite end, the slots 32 providing clearance for the release of metal particles or chips from the path of a tap during the cutting of the screw-thread 34, as will be understood.

As best shown in Fig. 2, each of the bosses 26 is provided with a screw-threaded opening 36 extending from its front face 28 into its correlated slot 32, for the reception of a suitable machine screw 38, the drilling and tapping of the openings 36 being facilitated by the clearance provided by the slots 32, with respect to the screw-thread 34 within the bushing 22, whereby drill and tap breakage is obviated as will be understood by those skilled in the art.

Further in accordance with the invention and as best shown in Fig. 4, a complementary grounding member in the form of a rectangular U-shaped clip 40, for example, comprising a leg portion 42, provided with a suitable aperture 44, for receiving the machine screw 38 therethrough, a toe portion 46, parallel with the leg portion 42, and a heel portion 48 integral and square with the aforesaid leg and toe portions 44 and 46.

As best shown in Fig. 5, the toe portion 46 of the clip 40 is provided with small, spaced, parallel grooves 50, transversely thereof, for receiving the top or crown of at least two of the conduit screw-threads 14 in a like number of the grooves 50. The bent corner surface between the toe and heel portions 46 and 48, respectively, is suitably serrated as at 52, whereby the clip 40 is adapted to bite into and through the usual enamel coating provided on such outlet boxes when the clip 40 is forced down on the front face 28 of one of the bosses 26 with its serrated surface 52 in intimate contact with the inner side of one wall of the outlet box 20, as best shown in Fig. 3.

Preparatory to securing the bushing 22 on the threaded end portion 14 of the conduit 10, the apertured leg portion 42 of the grounding clip 40 is seated on the front face 28 of either of the bosses 26, depending upon which boss is in the most accessible position, with its toe portion 46 disposed in the slot 32 formed within the bushing 22, the clip 40 being substantially so retained by means of the machine screw 38. Thus, when the threaded end portion 14 of the conduit 10 is intruded into an appropriate knock-out opening 18 in the outlet box 20, and the grounding bushing 22 threaded thereon, the leading convolution of the screw-thread 14 on the conduit 10 engages the innermost free end of the toe portion 46 of the grounding clip 40 and rides into one of the grooves 50, formed transversely of the toe portion 46, whereby the clip 40 is raised with its toe portion 46 in seating contact with a portion of the bottom of the slot 32, as in Fig. 4, rotation of the bushing 22 relative to the conduit 10 being continued until the wall of the outlet box 20 is clamped between the shoulder 16, formed by the lock-nut 12 and the inner end face of the bushing 22, as clearly shown in Fig. 2.

With the grounding bushing 22 so secured on the intruded end of the conduit 10, as in Fig. 2, the machine screw 38 is now turned down firmly on the leg portion 42 of the grounding clip 40, until it is forced substantially into contact with the front face 28 of the boss 26, in which position the toe portion 46 will have been bent, relative to the heel portion 48 of the clip 40, as in Fig. 3, at an acute angle to the axial center of the conduit 10, and thus brought into threaded engagement with at least two convolutions of the conduit screw thread 14, whereby a direct, more positive ground connection is made with the conduit 10, and through the conduit, with the outlet box 20.

While the invention has been illustrated and described with respect to a preferred embodiment thereof, it is to be expressly understood that various changes and modifications may be made therein without departing from the inventive concept underlying the same. Therefore, the invention is not to be limited except as is necessitated by the prior art and the scope of the appended claims.

I claim:

1. A grounding bushing for securing a screw-threaded end portion of a conduit in a knock-out opening provided therefor in an outlet box, comprising an internally screw-threaded annular member having a rectangular boss projecting radially from its outer periphery at a forwardly inclined angle to its axial center, a rectangular U-shaped grounding clip having parallel screw-thread engaging grooves transversely of the outer face of one leg thereof and an aperture through its opposite leg mounted on said boss in inverted position astride said bushing with its grooved leg depending into said bushing in central parallel alignment with said boss, said bushing having a rectangular slot transversely of its inner periphery and extending into said boss in central angular alignment therewith, and a screw extending through the aperture in said opposite leg and adjustably threaded through said boss at right angles thereto securing said grounding clip on said boss, said depending leg being deflected substantially into said slot upon threading said bushing on said conduit end portion with the grooved face of said depending leg in bearing engagement with the leading screw-thread on said conduit end portion, and said depending leg further deflected toward the axial center of said conduit end portion upon securing the apertured leg of said clip on the outer inclined face of said boss by further adjustment of said screw to bring the heel portion of said depending leg into intimate contact with an inner side of said outlet box and additional grooves in said depending leg into engagement with the screw-threads on said conduit end portion while the toe portion thereof is held between the leading screw-thread on said conduit end portion and the bottom of said rectangular slot.

2. A grounding bushing for securing a screw-threaded end portion of a conduit in a knock-out opening provided therefor in an outlet box, comprising an internally screw-threaded annular member having a rectangular boss projecting radially from its outer periphery at a forwardly inclined angle to its axial center, a rectangular U-shaped grounding clip having parallel screw-thread engaging grooves transversely of the outer face of one leg thereof and a plurality of serrations in its adjacent heel portion normal to said grooves and an aperture through its opposite leg mounted on said boss in inverted position astride said bushing with its grooved leg depending into said bushing in central parallel alignment with said boss, said bushing having a rectangular slot transversely of its inner periphery and extending into said boss in central angular alignment therewith, and a screw extending through the aperture in said opposite leg and adjustably threaded through said boss at right angles thereto securing said grounding clip on said boss, said depending leg being deflected substantially into said slot upon threading said bushing on said conduit end portion wtih the grooved face of said depending leg in bearing engagement with the leading screw-thread on said conduit end portion, and said depending leg further deflected toward the axial center of said conduit end portion upon securing the apertured leg of said clip on the inclined face of said boss by further adjustment of said screw to bring the serrated heel portion of said depending leg into intimate contact with an inner side of said outlet box and additional grooves in said depending leg into engagement with the screw-threads on said conduit end portion while its toe portion is held between the leading screw-thread on said conduit end portion and the bottom of said rectangular slot.

References Cited in the file of this patent

UNITED STATES PATENTS

| | | |
|---|---|---|
| 1,775,352 | Mahan | Sept. 9, 1930 |
| 1,795,577 | Schneider et al. | Mar. 10, 1931 |
| 1,833,956 | Thomas | Dec. 1, 1931 |
| 1,899,365 | Thomas | Feb. 28, 1933 |
| 2,219,014 | Madden | Oct. 22, 1940 |
| 2,260,136 | Bergan | Oct. 21, 1941 |
| 2,511,668 | Clark | June 13, 1950 |
| 2,540,999 | Thomas | Feb. 6, 1951 |